United States Patent [19]

Wood

[11] 4,177,638
[45] Dec. 11, 1979

[54] SINGLE SHAFT GAS TURBINE ENGINE WITH RADIAL EXHAUST DIFFUSER

[75] Inventor: Homer J. Wood, Sherman Oaks, Calif.

[73] Assignee: Deere & Company, Moline, Ill.

[21] Appl. No.: 589,909

[22] Filed: Jun. 24, 1975

[51] Int. Cl.² ............................................. F02C 7/10
[52] U.S. Cl. ............................................. 60/39.51 H
[58] Field of Search ............... 60/39.51 R, 39.51 H; 165/8; 415/205

[56] References Cited

U.S. PATENT DOCUMENTS 3,276,515  10/1966  Whitfield ............................................. 165/8

FOREIGN PATENT DOCUMENTS 586159  11/1959  Canada ................................. 60/39.51 H
936881  9/1963  United Kingdom ....................... 415/205

Primary Examiner—Louis J. Casaregola
Attorney, Agent, or Firm—Fraser and Bogucki

[57] ABSTRACT

A compact single shaft gas turbine engine includes a radial compressor and a radial turbine mounted for rotation about a central axis and an axially inline disk regenerator disposed forward of the turbine. A highly efficient engine configuration minimizes energy loss along an improved gas flow path while permitting the engine to be mounted on a standard 22 inch wide farming tractor frame. Efficiency is further increased by a radial exhaust diffuser disposed between the regenerator and turbine which does not contribute substantially to engine size.

6 Claims, 15 Drawing Figures

SINGLE SHAFT GAS TURBINE ENGINE WITH RADIAL EXHAUST DIFFUSER

CROSS REFERENCE TO RELATED APPLICATIONS

This application is related to the following U.S. patent applications copending herewith:
1. Shank et al, "Single Shaft Gas Turbine Engine With Axially Mounted Disk Regenerator", Ser. No. 589,741, filed June 24, 1975 now abandoned.
2. Kahle et al, "Single Shaft Gas Turbine Engine With Axially Mounted Disk Regenerator", Ser. No. 589,744, filed June 24, 1975 now abandoned.
3. Kahle et al, "Single Shaft Gas Turbine Engine With Axially Mounted Disk Regenerator", Ser. No. 589,679, filed June 24, 1975 (U.S. Pat. No. 4,040,249).
4. Wood, "Centrifugal Compressor With Indexed Inducer Section and Pads for Damping Vibrations Therein", Ser. No. 544,520, filed Jan. 27, 1975 (U.S. Pat. No. 3,958,905).
5. Hewlitt, "Gas Turbine Engine Regenerator Seal Assembly With Floating Leaf Sealing Element", Ser. No. 529,406, filed Dec. 4, 1974, (U.S. Pat. No. 3,954,135).
6. Kaesser et al, "Supersonic Shock Wave Compressor Diffuser With Circular Arc Channels", Ser. No. 529,498, filed Dec. 4, 1974 (U.S. Pat. No. 4,012,166).

BACKGROUND OF THE INVENTION

1. Field of the Invention

This invention relates to single shaft gas turbine engines and more particularly to a single shaft gas turbine engine which is advantageously arranged to permit mounting of the engine on the narrow 22 inch wide frame of a standard sized farming tractor while providing a particularly efficient engine configuration.

2. Description of the Prior Art

A single shaft gas turbine engine is an engine having a turbine mounted on a shaft and a compressor coupled to rotate with the turbine. The turbine receives hot, high pressure gases and converts the energy of these gases to rotational torque which is applied to the shaft on which the turbine is mounted. The shaft torque is in turn applied to rotate the compressor which receives input gases at approximately atmospheric pressure and increases the pressure thereof before they are heated in combustor and applied to drive the turbine. Approximately two-thirds of the rotational energy which is supplied to the shaft by the turbine is required to drive the compressor and the remaining one-third is available as useful power for driving apparatus external to the engine. A considerable amount of research and development has been conducted on the subject matter of single shaft gas turbine engines with research, inter alia, being particularly directed toward analyzing the effects of temperature and pressure changes at various points along the working fluid flow path, developing improved compressors, turbines, and combustors, and improving the efficiency with which the working fluid is handled as it is passed through an engine. While much progress has been made in this regard, the problems which have been encountered are extremely complex and much room for improvement remains. Because of the high temperatures and high velocities to which the working fluid is subjected, significant power losses are encountered in the fluid flow path of a present day gas turbine engine.

One technique which has been utilized to improve the efficiency of a gas turbine engine is to utilize a heat exchanger such as a counterflow recouperator or a regenerator to transfer heat from hot exhaust gases to cooler compressed gases prior to their entry into the combustor. One form of heat exchanger is an annular regenerator which is axially positioned between the compressor and turbine and mounted coaxially with the compressor and turbine with the annular regenerator extending circumferentially about the engine housing. While permitting engine efficiency to be increased by reducing the amount of energy that is wasted as exhaust heat, such a regenerator introduces additional losses into the working fluid flow path. In particular, the low pressure, high volume, high temperature exhaust gases must leave the turbine in an axially forward direction, be turned through 180° and conducted a considerable distance in an axially rearward direction before they pass through the regenerator and are exhausted to the atmosphere. This rearward motion of the exhaust gases brings them into closer proximity to the inlet and reduces engine efficiency by increasing heat transfer either through engine components or through the atmosphere to the inlet gases. Furthermore, positioning a regenerator adjacent the side of an engine housing necessarily increases the width of the gas turbine engine. As presently known, such arrangements are too wide for mounting on a standard farm tractor frame.

Both conical and annular diffusers have been investigated for recovery of part of the kinetic energy of exhaust gases as they leave a turbine. However, conical diffusers have the disadvantage of greatly increasing engine length. With the pressure of the exhaust gases increasing as they flow through an exhaust diffuser, and with the exhaust gases exiting the diffuser to approximately atmospheric pressure, the pressure of the exhaust gases is necessarily below atmospheric pressure at the point where they leave the turbine and enter the diffuser. The working fluid pressure drop across the turbine is thus increased and greater power can be extracted from the turbine. The results of one study on the use of exhaust diffusers was presented to the "International Automotive Engineers Congress" in Detroit, Mich., Jan. 13-17, 1969 by Charles A. Amann and David W. Dawson and has been published by the Society of Automotive Engineers in paper No. 690,032.

SUMMARY OF THE INVENTION

A single shaft, gas turbine engine in accordance with the invention is shaped to combine high gas flow path efficiency with a narrow profile which permits mounting of the engine on a 22 inch wide standard tractor frame. A single stage radial flow compressor which rotates about a central axis receives inlet gases near the rear of the engine and increases the pressure thereof. A heat exchanger, which may be a recouperator but is a disk regenerator in the disclosed example, is disposed at the front of the engine and a turbine and combustor assembly is located between the heat exchanger and compressor. Compressed gases are collected from around the periphery of the compressor and conducted axially forward through a high pressure passage which extends around the lower periphery of the engine to the disk regenerator which is disposed approximately coaxially with the central axis. The high pressure gases flow axially forward past the lower periphery of the regenerator and are then heated as they flow axially rearward through the lower half of the regenerator. Heated high pressure gases are conducted by a hot air duct axially rearward along the lower periphery of the engine to a tangential combustor. Ducts carrying the high pressure gases are integral with cast engine housing elements and carry the heated high pressure gases between the non-heated high pressure gases and exhaust gases without need for any crossover of the contraflowing gases. From the combustor, the gases enter a scroll which surrounds a radial turbine rotor that is coaxially connected to drive the compressor. Exhaust gases pass through a radial diffuser and then move axially forward through an upper half of the regenerator to the atmosphere.

This arrangement provides excellent operating efficiencies in a low cost single shaft gas turbine engine. Flow path losses and duct size are minimized by conducting the low volume, low temperature, high pressure gases through the greater distance and by passing the cooler high pressure gases adjacent the exterior wall of the engine while the heated high pressure gases pass rearwardly between the unheated gases and the exhaust gases as they return to the combustor after passing through the regenerator. Heat loss to the atmosphere is thus minimized by passing the cooler gases adjacent the outer wall of the engine and some further heat exhange is realized by passing the heated gases adjacent the exhaust gases. Engine width is further minimized by making the gas ducts an integral part of the structural cast iron engine housing assemblies and by utilizing the available space between the compressor and turbine periphery to collect high pressure gases as they exit the high pressure diffuser and conduct these gases to the lower portion of the engine where they are carried axially forward toward the axially aligned regenerator without increasing the width of the engine. Similarly, space between the exhaust diffuser and turbine is utilized to circumferentially distribute gases about the combustor as they arrive at a region which lies principally beneath the engine. This invention thus provides an efficient flow path, an exhaust diffuser and a heat exchanger all within engine dimensions which are compatible with a standard size farm tractor.

BRIEF DESCRIPTION OF THE DRAWINGS

A better understanding of the invention may be had from a consideration of the following detailed description taken in conjunction with the accompanying drawings, in which.

DETAILED DESCRIPTION

Figure 11:
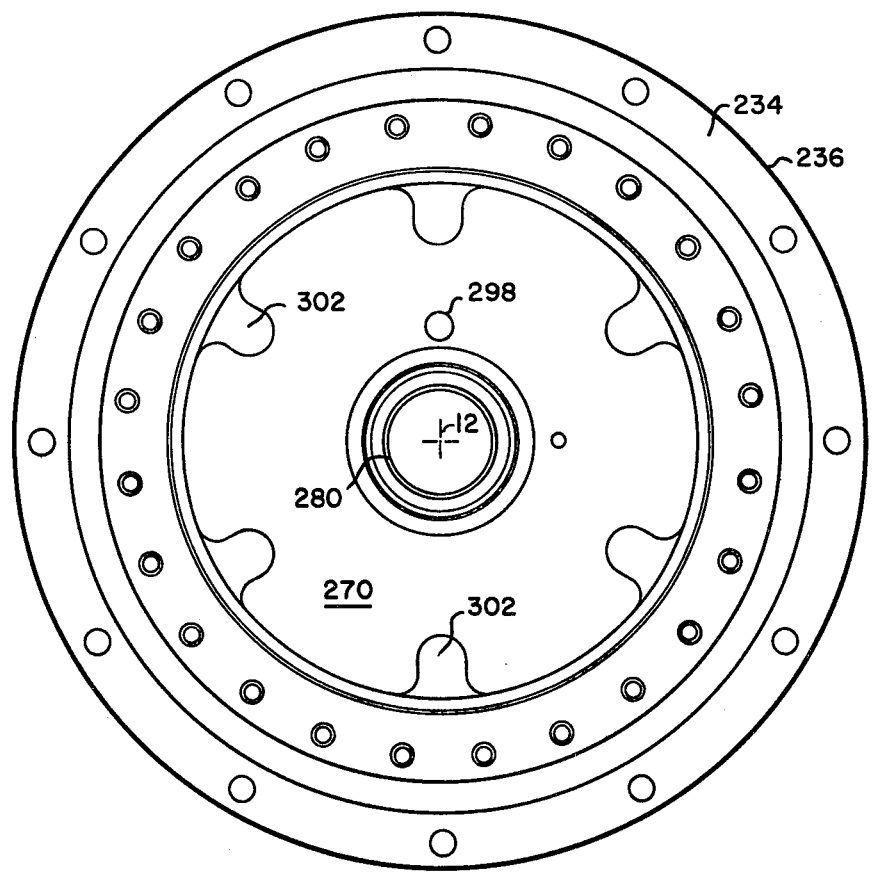
FIG. 11 is an end view of the bearing support housing shown in FIG. 9, taken from the front.
Figure 1:
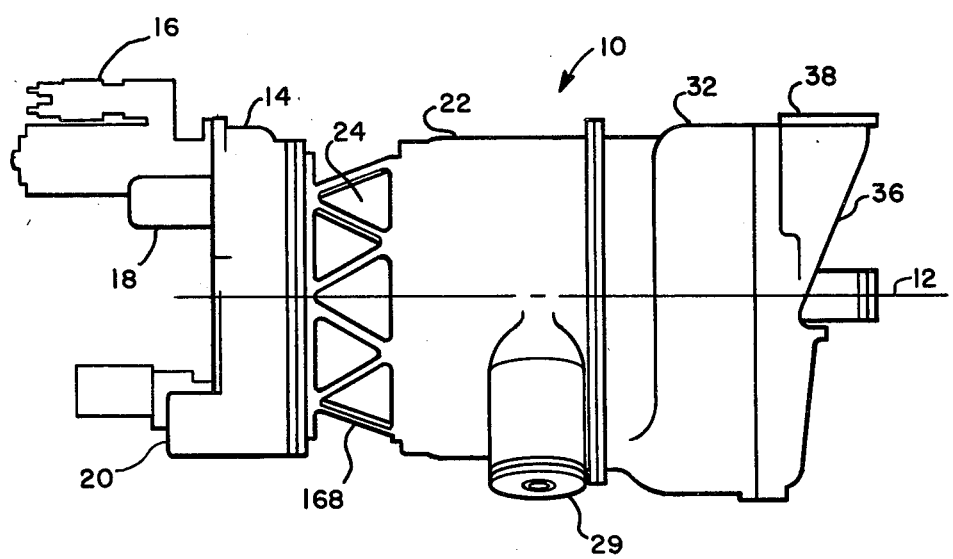
FIG. 1 is a side elevation view, taken from the right side of a single shaft gas turbine engine in accordance with the invention.
Figure 2:
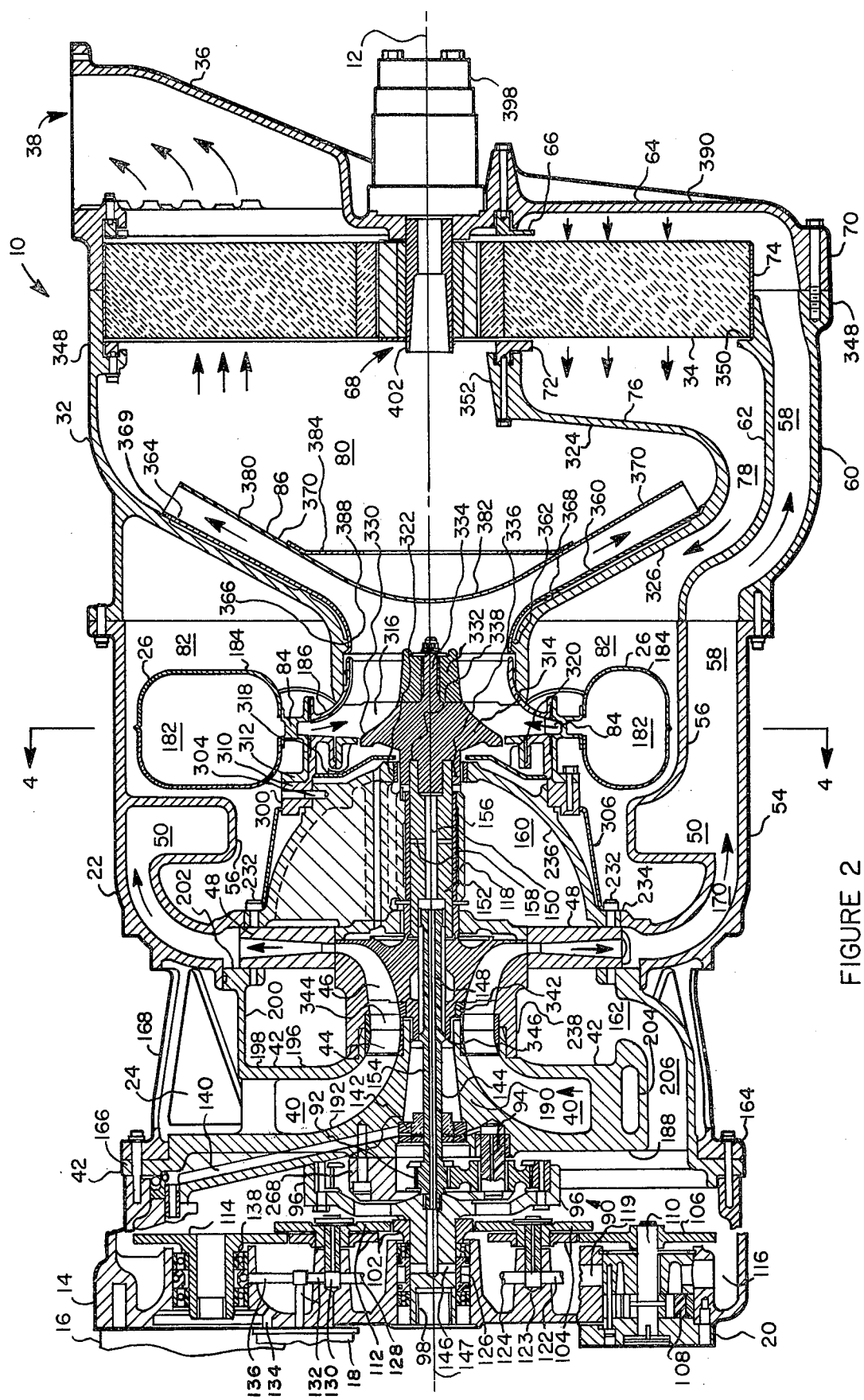
FIG. 2 is a sectioned side view of the engine shown in FIG. 1, taken predominantly along a vertical plane through a central axis, but with sections selectively rotated for clarity.

As shown in FIGS. 1 and 2 a single shaft gas turbine engine 10 in accordance with the invention is disposed approximately concentrically about a central axis 12. The engine 10 develops approximately 250 horsepower and is designed for mounting on a 22 inch wide standard farm tractor frame. A gear box 14 is disposed at the rear of the engine 10 and supports accessory equipment such as an electric starter motor 16, an oil filter 18 and a conventional fuel control system 20. The forward end of the gear box 14 is connected to the rear of a main body housing 22 having triangular air inlet apertures 24. A scroll 26 and a combustor 28 are positioned at the forward end of the main body housing 22. The combustor 28 is disposed within a container 29 on the righthand side of the engine external to the generally cylindrical periphery of the main body housing 22. A regenerator housing 32, which supports a ceramic disk regenerator 34 concentrically about the central axis 12, has a generally cylindrical exterior which mates in end-to-end relationship with the forward end of the main body housing 22. A regenerator cover 36 mates with the forward end of the regenerator housing 32 to enclose a forward end of the engine and define an exhaust outlet 38.

Atmospheric gases enter the engine 10 through air inlet apertures 24 and then flow through a circumferentially extending inlet passage 40 in an inlet housing 42 past inlet guide vanes 44 which give the gases a tangential velocity to a compressor assembly 46. The gases depart the compressor assembly 46 with radially outward and tangential velocity components which are converted from kinetic energy to static pressure by a high pressure compressor diffuser 48. After exiting the compressor diffuser 48 in a generally radial direction, the compressed gases are turned axially forward and collected by a plenum 50 which extends circumferentially around the engine 10 between the compressor assembly 46 and a turbine assembly 52. The plenum 50 is defined between an outer, cylindrical circumferential wall 54 of main body housing 22 and an inner wall 56 of main body housing 22 which extends axially forward along the lower portion of the engine 10 to define a high pressure passageway 58 between the cylindrical outer wall 54 and the axially forward extending portion of inner wall 56. Beyond the main body housing 22 the high pressure passageway 58 continues axially forward along the lower portion of the engine 10 and is defined between an outer cylindrical wall 60 of regenerator housing 32 which mates with the outer wall 54 and a dividing wall 62 of regenerator housing 32 which extends along the lower portion of the engine 10 radially spaced apart from the outer wall 60 between the regenerator 34 and the inner wall 56.

A lower half 64 of regenerator cover 36, which generally conforms to the semi-circular shape of the lower half of the regenerator 34, engages a D-shaped seal 66 which extends horizontally across the front side of the regenerator 34 immediately below a hub portion 68 and periperally around the upper half of regenerator 34 on the front side. A rearwardly projecting flange 70 extends around the periphery of the regenerator 34 to mate with the cylindrical outer wall 60 and provide communication between the high pressure passageway 58 and the forward, planar surface of the lower half of regenerator 34. On the back side of regenerator 34 a O-shaped seal 72 has a horizontal crossbar extending opposite the crossbar of D-shaped seal 66 and a circumferential seal portion which extends about the complete periphery of the regenerator 34 on the back side thereof. The seals 66 and 72 operate to maintain the disk regenerator 34 in compression by restricting high pressure gases to the sealed, outer cylindrical circumference 74 of and the lower portion of regenerator 34. The high pressure gases are permitted to pass axially rearward through the lower half of the regenerator to absorb heat transferred from the exhaust gases and are then guided by an inner wall 76 toward a combustor 28. The inner wall 76 extends along the horizontal crossbar of seal 72 to engage the peripherally extending dividing wall 62 to form a hot, high pressure passage 78 which guides the heated, high pressure gases axially rearward along the lower periphery of the engine 10 between the high pressure passage 58 and an exhaust chamber 80.

A gas collection chamber 82 receives heated, high pressure gases from the passage 78 and distributes the gases about the periphery of the turbine assembly 52. The combustor 28, which is disposed tangential to scroll 26, receives the heated, high pressure gases from chamber 82 as well as fuel from the fuel control system 20. The combustor 28 heats the gases before they are distributed around the turbine assembly 52 by the scroll 26 prior to being directed radially inward past nozzle vanes 84 to impinge upon the turbine assembly 52 with a pre-established swirl velocity. Upon leaving the turbine assembly 52 in an axially forward direction, exhaust gases pass through a radial exhaust diffuser 86 which recovers some of the kinetic energy of the exhaust gases to maintain the exit of the turbine assembly 52 below the pressure in exhaust chamber 80. As the exhaust gases leave the radial diffuser 86 they are collected in the exhaust chamber 80 which is defined between the upper portion of the outer circumferential wall 60 and the inner wall 76. From the exhaust chamber 80 the exhaust gases pass axially forward through the top half of the regenerator 34 to heat the regenerator and are then vented through exhaust outlet 38 to the atmosphere.

Initial speed reduction is provided by a planetary gear system 90 which is housed within the gear box 14 and which includes a sun gear 92 which drives three planet gears 94 which are equally spaced about the circumference of sun gear 92 with only one planet gear 94 being shown in FIG. 1. The three planet gears 94 in turn drive a ring gear 96 which provides power output through a spline shaft 98. The planetary gear system 90 provides a speed reduction from approximately 69,000 rpm to 11,000 rpm at the ring gear 96 and spline shaft 98 thereon.

An accessory drive gear 102 is coupled for rotation with ring gear 96 and transmits torque through a reduction gear pair 104 to a drive gear 106 for a full flow oil pump 108 and fuel control 20. The fuel control system 20, which may be conventional in nature, monitors engine speed from a shaft 110 which is driven by the oil pump drive gear 106 to control the supply of fuel which is provided to combustor 28 in accordance with engine speed, exhaust gas temperature and external command signals. A second reduction gear pair 112 couples accessory drive gear 102 to a drive gear 114 of the conventional electric starter motor 16.

The oil pump 108 feeds a positive pressure lubrication system from oil which is collected in a sump 116. Relatively high temperatures are encountered in a main rotor area 118 of engine 10 and it has been found desirable to utilize a synthetic lubricating oil, though other lubricants may be acceptable. As it leaves an outlet orifice 119 of oil pump 108, the high pressure lubricant is conducted by tubing 122 (a central portion of which is omitted for clarity) to the closed end of a bore 123 which receives a shaft for the reduction gear pair 104. Lubricant which escapes between the reduction gear shaft and the bore returns by gravity feed to the sump 116. Most of the lubricant passes on through tubing 124 to bearings 126 which support the ring gear 96. Pressurized lubricant is also conducted by tubing 128 to the closed end of a bore 130 which receives a shaft for the second reduction gear pair 112 for lubrication of the shaft. Tubing 132 carries excess oil from the bore 130 to an oil filter 18 which returns oil through an outlet 134 to the oil sump 116 by gravity feed. Tubing 132 also carries high pressure oil to tubing 136 which provides lubrication communication with support bearings 138 for the starter motor drive gear 114. Internal oil passages (not shown) carry oil from the starter motor bearings 138 to an oil tube 140 which carries oil to a support bearing assembly 142 for a quill shaft 144.

A portion of the lubricant which is supplied to the ring gear bearings 126 is carried through radially extending bores 146 in the central hub of the ring gear 96 to a central axial bore 147 in ring gear 96 which provides communication between the radial bores 146 and a central bore 148 in the quill shaft 144. Clearance is allowed between the quill shaft 144 and ring gear 96 to permit lubricant to reach the bearing surfaces between these two elements which rotate in opposite directions at different speeds. Oil passes through the central bore 148 to a central bore 150 of a main rotor shaft 152 which is coupled by a flexible spline joint to quill shaft 144 and mounted for rotation about the central axis 12. The main rotor shaft 152 supports the compressor assembly 46 and turbine assembly 52 in cantilever fashion on either side of a main rotor bearing 156. Radially extending bores 158 in the main rotor shaft 152 carry lubricant from the central bore 150 to the main rotor bearing 156. After passing through the main rotor bearing 156, oil accumulates in a sump area 160 beneath the main bearing 156 and passes through internal holes (not shown in FIG. 1) in a high pressure diffuser 48 to a passageway 162 which returns the lubricant to the oil sump 116. As the lubricant passes through the diffuser 48, heat from the diffuser 48 is imparted to the oil and an external tube connecting the sump 160 with the sump 116 would therefore appear to be desirable in lieu of the passages through the diffuser 48. In a completely separate lubrication cooling circuit (not shown) lubricant is pumped by an external oil pump from the sump 116 through an oil cooler and back to the sump 116. This oil cooling circuit may be conventional in nature and forms no part of this invention, but merely maintains the oil at acceptable temperatures.

Because of the high rotational speeds of the quill shaft 144 and main rotor shaft 152, a tremendous amount of kinetic energy is imparted to the lubricating fluid passing through the central bores 148 and 150. This high kinetic energy results in oil flow rates which are difficult to control. External oil tube connections to the quill shaft support bearing assembly 142 and main rotor bearing assembly 156 are therefore desirable in lieu of passage of the oil through the shaft bores 148, 150.

Figure 3:
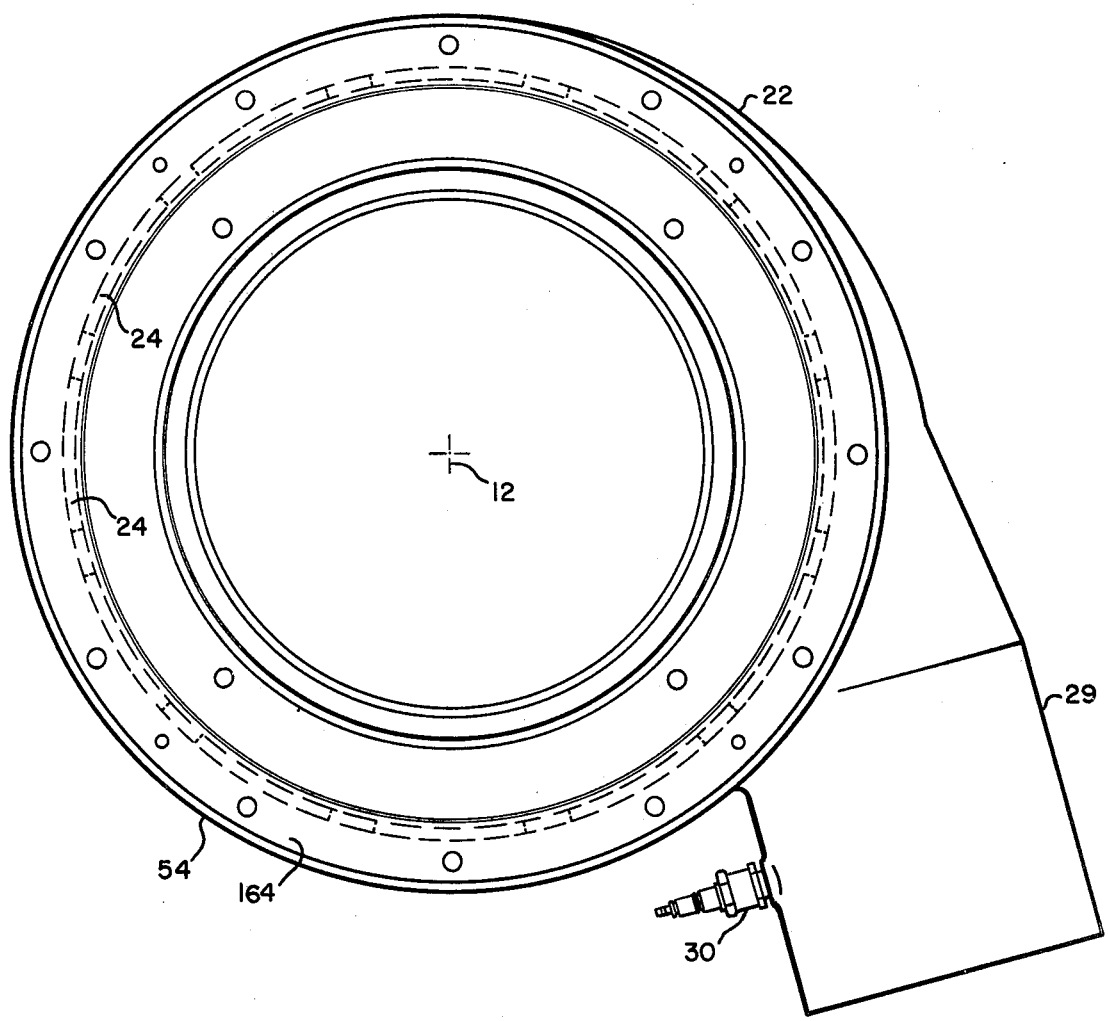
FIG. 3 is an end view of a main body housing in the engine shown in FIG. 1, taken from the rear.

In addition to the gear box 14, the primary structural and support features and shape of the engine 10 are defined by 5 housing castings, each of which is an integral element. A main body housing 22, which is further shown in FIGS. 3, 4 and 5, defines the outer shell of the engine in the vicinity of the compressor assembly 46 and turbine rotor assembly 52. Just forward of the triangular air intake apertures 24 the main body housing 22 comprises an outer cylindrical wall 54 and an inner wall 56 between which a forwardly extending duct or channel 58 is defined to carry high pressure working gases from the high pressure diffuser 48 forward toward the regenerator 34. The space between the compressor assembly 46 and turbine rotor assembly 52 is utilized to define the plenum or collecting chamber 50 in which high pressure gases from the high pressure diffuser 48 are collected from around the complete circumference of the engine and conducted to the lower portion of the engine 10 where they may be conducted axially forward by passage 58. This arrangement minimizes losses by providing a large volume plenum 50 which permits the gases to be moved circumferentially with relatively low velocities and losses while placement of passge 58 which extends axially forward between the outer wall 54 and inner wall 56 provides a large volume passage 58 toward the regenerator 34 which does not substantially increase engine width.

Main body housing 22 terminates at the rear in a radially extending circumferential flange 164 which is secured by bolts which extend axially through the flange 164, as well as a radially extending circumferential flange 166 of inlet housing 42 to engage the gear box 14.

Air inlet grating 168 extends axially forward from rear flange 164 along a generally cylindrical periphery to engage cylindrical outer wall 54. Between outer wall 54 and inner wall 56 a passage 170 is formed which extends around the entire circumference of high pressure diffuser 48. Passage 170 receives compressed gases in a radial flow direction and turns the gases axially forward toward the plenum 50 which serves as a manifold to carry the gases to a lower portion of the main body housing 22 where they are conducted axially forward toward regenerator 34 through high pressure passage 58. The plenum 58 advantageously utilizes available space between the compressor assembly 46 and turbine assembly 52 to increase the circumferential volume for the high pressure gases and thereby reduce losses.

Figure 4:
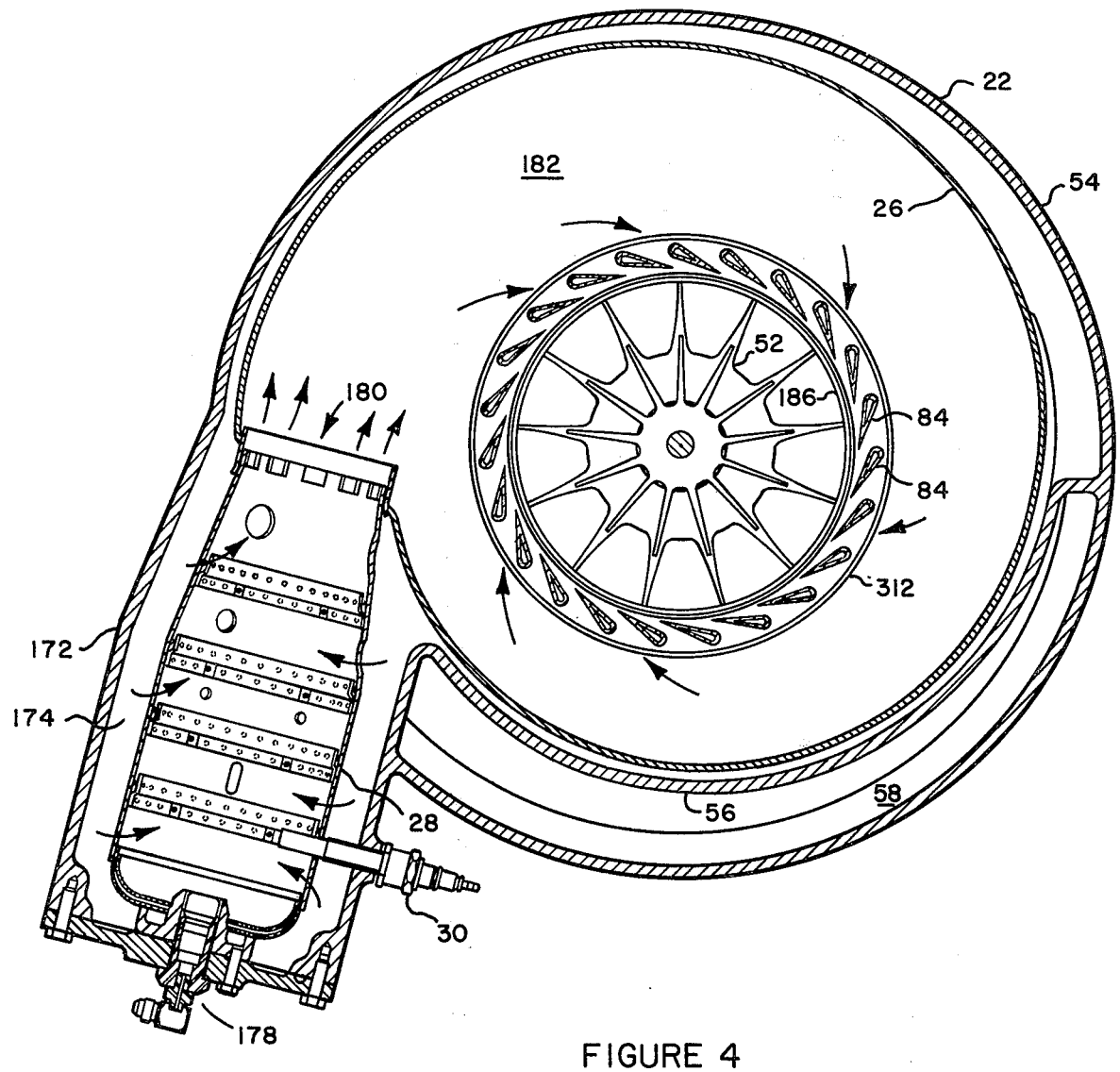
FIG. 4 is a sectioned view of the engine shown in FIG. 1, taken along line 4—4 as shown in FIG. 2.
Figure 5:
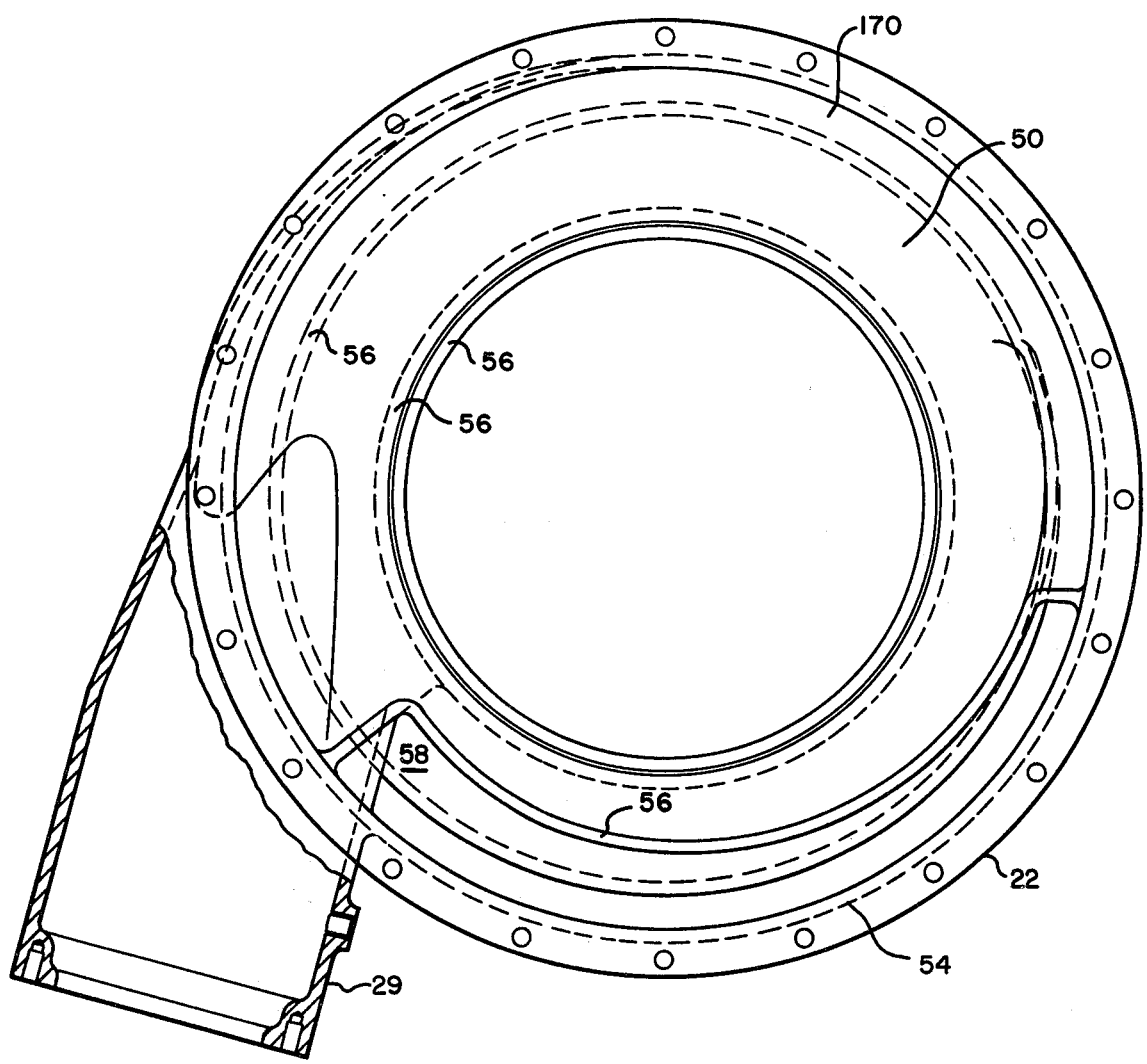
FIG. 5 is an end view of a main body housing in the engine shown in FIG. 1, taken from the front.

As best shown in FIG. 4, the scroll 26 is disposed about the turbine assembly 52. The combustor 28 extends tangentially from the righthand side of the scroll 26. The combustor container 29 which is integral with the main body housing 22 extends from the righthand side thereof to form a cylindrical cavity 174 within which a conventional, perforated combustor 28 is disposed. A fuel nozzle assembly 178 is connected to inject fuel into the bottom of the cylindrical combustor 28 and the igniter 30 is disposed a short distance above the nozzle assembly 178. Igniter 30 is utilized only during start up with combustion being continuous and self-sustaining during normal operation of the engine 10. Heated, high pressure gases from regenerator 34 flow axially rearward through passage 78 to chamber 82 from which they enter the cylindrical cavity 174. Compressed air enters the combustor 28 through holes therein, is further heated to approximately 1800° F. by the burning of fuel and is ejected through an outlet 180 of combustor 28 into a volume 182 which is defined within a volute scroll 26. The scroll 26 and enclosed volume 182 extend peripherally about a turbine shroud 186 and vanes 84 which form nozzles to direct the high temperature gases from scroll 26 onto the turbine assembly 52 in a radially inward direction, but with a substantial tangential velocity component.

Figure 6:
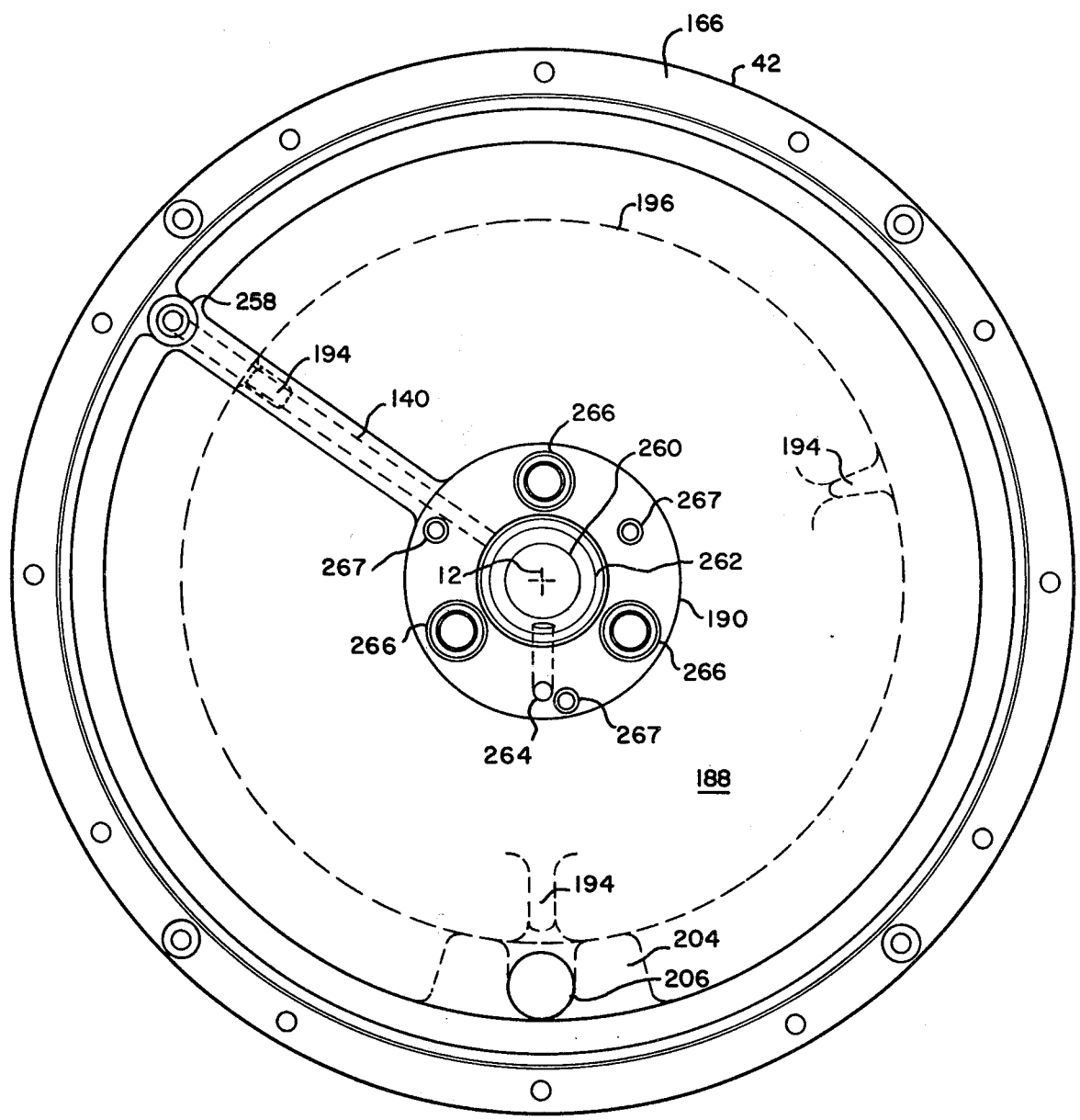
FIG. 6 is an end view of an air inlet housing in the engine shown in FIG. 1, taken from the rear.

As shown in FIGS. 2 and 6, the air inlet housing 42 is disposed at the rearward portion of the engine between the gear box 14 and the compressor assembly 46 internal to the main body housing 22. The inlet housing 42 has a generally diskshaped rear wall 188 which extends between a hub 190 near the central axis 12 and the flange 166 at the outer periphery of the air inlet housing 42. The wall 188 is generally flat and concentric with central axis 12 on the rearward side but on a forward side 192, wall 188 defines one side of air inlet passage 40. After extending radially inward for a short distance from the flange 166, side 192 follows a smooth curve as it turns axially forward to define a circumference which is substantially the same as the diameter of a hub at the inlet of compressor assembly 46. A plurality of vane-like webs 194 are spaced about the central axis 12 and extend axially forward from the forward side 192 of wall 188 to support an L-shaped member 196 which extends circumferentially about central axis 12 and defines a radially extending rear wall 198 and an outer circumference wall 200 of the annular oil passage 162. The rearward side of wall 198 extends radially inward then follows a smooth curve axially forward to mate with a compressor shroud 238. A cicumferentially extending flange 202 is disposed about the forward edge of outer wall 200. Flange 202 mates with the high pressure diffuser 48 and the outer wall 54 of inlet housing 22 to further support the L-shaped member 196 at the forward end thereof. A pipe 204 having a circular aperture 206 is formed adjacent the bottom of the air inlet housing 42 to provide communication between the oil passage 162 and the oil pump 116.

The oil tube 140 is formed as an integral part of the wall 188 to carry pressurized oil from a connection 258 adjacent the rear flange 166 to a bore 260 which extends axially through the hub 190. Adjacent the rear surface the bore 260 has an enlarged portion 262 which receives quill shaft support bearings 142. An aperture 264 extends from the enlarged bore 262 to the rear face of wall 188 to drain oil away from the bearing 142. Three bores 266 are equally spaced about the central bore 260 in the vicinity of the hub 190 and extend axially forward into the wall 188 to receive the central shafts of planet gears 94. Three tapped bolt holes 267 are circumferentially spaced between the bores 266 to receive bolts which secure a planetary gear support structure 268 to the rear face of wall 188. The air inlet housing 42 thus serves to support the planetary gear system 90 and to guide intake air to the inlet of compressor assembly 46.

Figure 8:
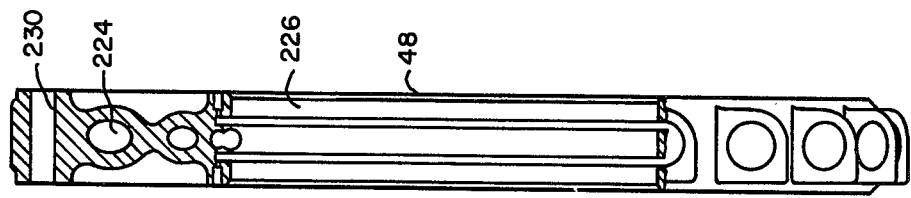
FIG. 8 is a sectioned view of the diffuser shown in FIG. 7, taken along line 8—8.
Figure 7:
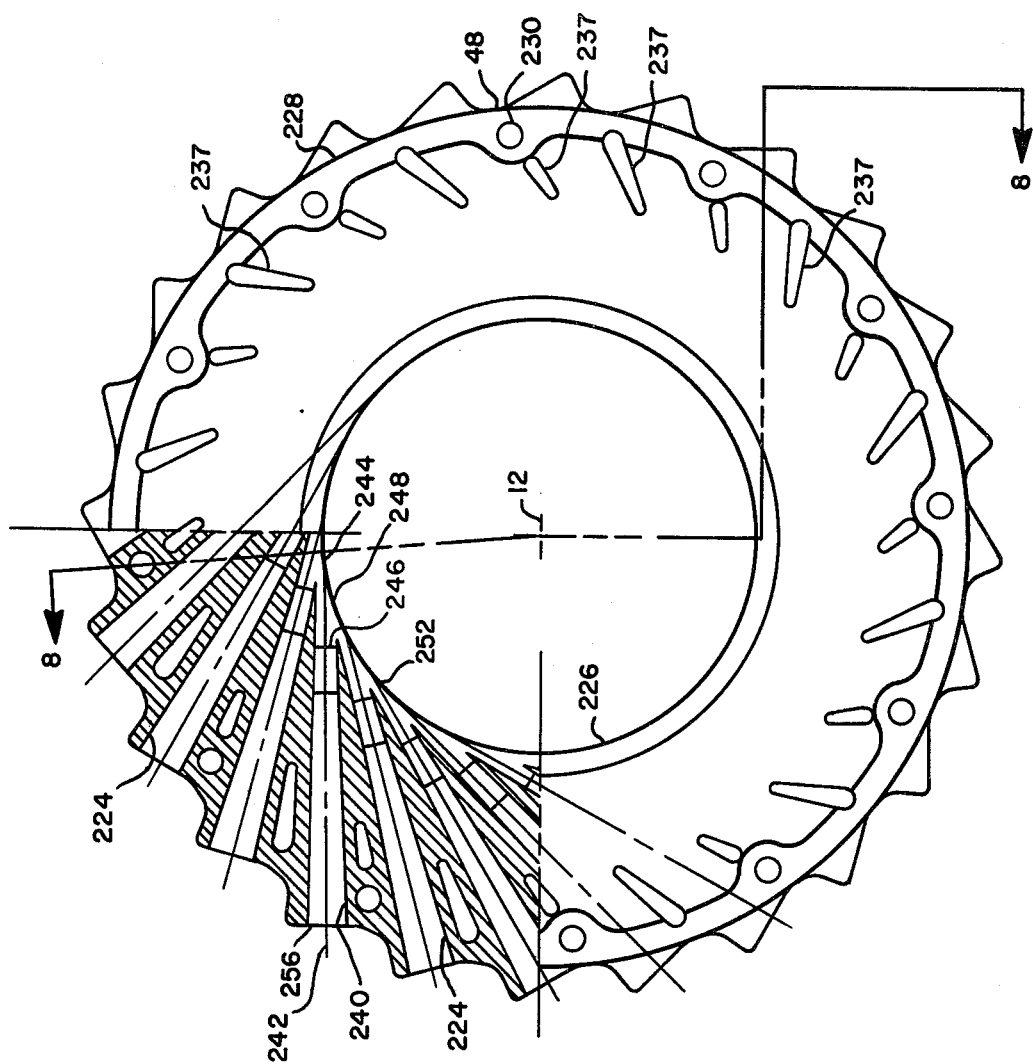
FIG. 7 is a plan view, partly broken away, of a high pressure diffuser used in the engine shown in FIG. 1.
Figure 10:
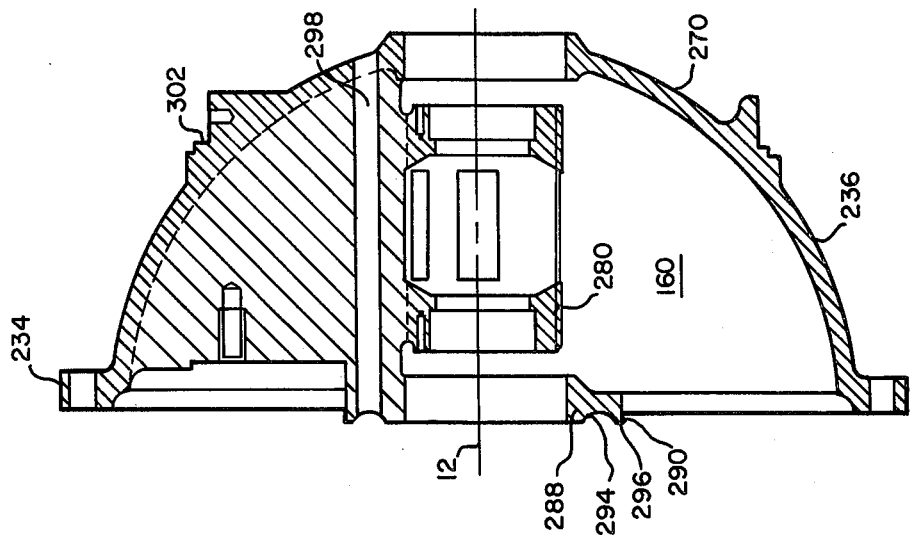
FIG. 10 is a sectioned side view of the bearing support housing shown in FIG. 9, taken along line 10—10.
Figure 9:
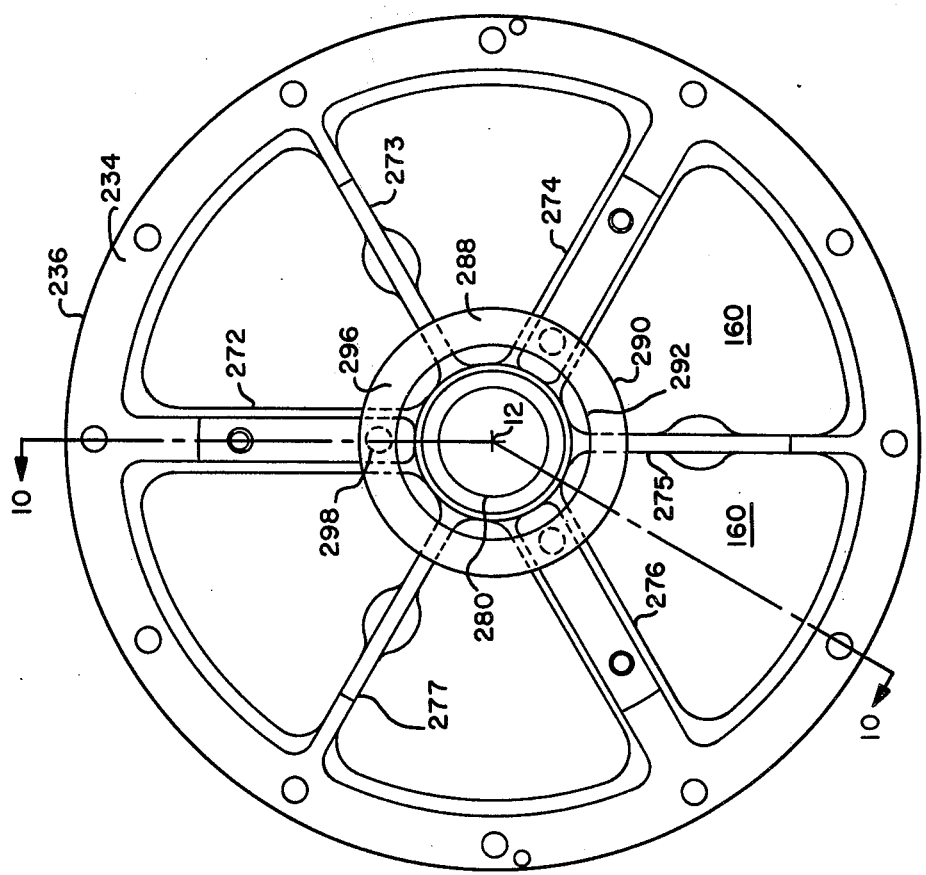
FIG. 9 is an end view of a bearing support housing used in the engine shown in FIG. 1, taken from the rear.

As shown in FIGS. 2, 7 and 8, the annular channel diffuser 48 is disposed concentrically about the outer circumference of compressor assembly 46 to receive high energy gases expelled therefrom. Diffuser 48 has a plurality of uniform, equally spaced channels 224 extending between a 6.028 inch diameter inner circumference 226 and a 12.01 inch diameter outer cicumference 228. A plurality of axially extending bolt holes 230 are disposed about the diffuser 48 near the outer circumference 228 and receive bolts 232 which secure the diffuser 48 between a radially extending flange 234 of a main bearing housing 236 and a radially extending forward flange 202 of inlet housing 42. A compressor shroud 238, which is secured to the air inlet housing 236, extends along the outer periphery of the compressor assembly 46 between the inlet guide vanes 44 and the diffuser 48 to constrain the inlet air flow to the vicinity of the compressor blades. A plurality of axially extending apertures 237 are disposed about the diffuser 48 near the outer circumference 228 to carry bearing oil from main bearing sump area 160 to oil passage 162. The passages 237 are circumferentially spaced to avoid the channels 224.

As particularly represented by channel 240, each of the channels 224 is circular in cross section about a longitudinally extending central axis 242. Longitudinal axis 242 is tangential to the inner circumference 226 at a tangent point 244. Between the tangent point 244 and a plane 246 which is spaced along the longitudinal axis 242 1.608 inches from tangent point 244, an inlet portion 248 of channel 240 is cylindrical with a diameter of 0.282 inches. Between a plane 250, which is spaced 2.249 inches from the tangent point 244, and the plane 246, a conical diffusion region 252 is formed having a total included angle of divergence of three degrees. A third section 255 of channel 240 extends between the plane 250 and an outlet plane 256 which is displaced 5.47 inches along the longitudinal axis 242 from tangent point 244. The section 255 is conical in shape with a total included angle of 6°. An improved arrangement of the high pressure diffuser 48 which is suitable for use in the engine 10 is described in a co-pending patent application Ser. No. 529,498, filed Dec. 4, 1974, entitled "Supersonic Shock Wave Compressor Diffuser With Circular Arc Channels", by Kaesser et al.

As shown in FIGS. 2, 9, 10 and 11, the main bearing housing 236 is positioned within the main body housing 22 immediately behind the turbine rotor assembly 52 and is secured by rearward facing, radially extending flange 234 and bolts 232 to the high pressure diffuser 48 and air inlet housing 42. The bearing housing 236 has an outer hemispherical shell 270 which is integral with flange 234 and opens toward the rear. A plurality of web members 272-277 extend radially inward from the outer hemispherical shell 270 to support a generally cylindrical bearing support hub 280 concentrically about the central axis 12. The hub 280 receives the main bearing 156 which provides the primary support for main rotor shaft 152.

A central, circular flange 288 extends axially rearward a short distance beyond the outer flange 234. Flange 288 is integral with the web members 272-277 and has a circular outer circumference 290 which engages the inner circumference 226 of high pressure diffuser 48 for a short axial distance to insure proper alignment and concentricity of diffuser 48 with the central axis and compressor assembly 46. An inner circumference 292 of flange 288 is somewhat larger than the hub 280 to avoid any interference with main shaft 152 or the insertion of the main bearing 156. A circular concavity 294 in a rearward facing surface 296 of flange 288 insures communication of the entire periphery of flange 288 with an axially extending bore 298 which extends from the concavity 294 through web member 272 and through the forward end of hemispherical shell 236 a short distance above the hub 280. Axial bore 298 helps reduce axial forces on the compressor assembly 46, turbine assembly 52 and main rotor shaft 152 by equalizing pressures between areas immediately rearward of the turbine rotor assembly 52 and immediately forward of the compressor assembly 46.

A bearing housing ring 300 extends circumferentially about the hemispherical shell 270 of bearing housing 236 immediately behind the turbine rotor assembly 52. The bearing housing ring 300 is secured to bosses 302 on shell 270 by circumferentially spaced, radially extending force fitting pins 304. A generally conical heat shield 306 extends rearwardly from bearing housing ring 300 to flange 234 where it is secured by the bolts 232. A circumferentially extending back plate flange 310 is secured between the bearing housing ring 300 and a nozzle assembly 312 which supports vanes 84. The back plate flange 310 forms a portion of a rear wall which extends circumferentially about the rear of turbine rotor assembly 52 and extends radially between the nozzle assembly 312 and a hub 314 of turbine rotor assembly 52 at an axial position immediately behind turbine blades 316 to limit the escape of engine gases other than in the desired direction of axially forward from the turbine rotor assembly 52. An inner back plate 318 is secured to back plate flange 310 and extends circumferentially about the turbine hub 314 immediately behind the blades 316 to complete the rear wall behind the rotor. Further protection from the high temperatures of the rotor area is provided by a generally disk-shaped heat shield 320 which is positioned behind the turbine rotor assembly 52 between the back plate flange 310 and inner back plate flange 318 and the bearing housing 236 to protect the main bearing housing 236. A labyrinth seal 322 is disposed to seal the main bearing housing 236 about the hub 314 of the turbine rotor to contain the bearing lubricant.

The nozzle assembly 312 provides a space of fixed axial length through which heated gases must pass as they leave scroll 26 to impinge upon the turbine rotor assembly 52. Circumferentially spaced about the nozzle assembly 312 are a plurality of vanes 84 (See FIG. 4) which are disposed to constrict the gas flow area and impart a substantial tangential velocity to the hot working gases before they impinge upon the turbine rotor assembly 52.

As shown in FIG. 2, the turbine rotor assembly 52, which may be of conventional construction, includes a turbine section 330 and an exducer section 332 mounted axially forward or downstream of the turbine section 330 on an axially forward projecting small diameter cylinder 334 which is integral with the hub of turbine section 330. The turbine section 330 extends in cantilever fashion from the main rotor shaft 152. A cylindrical hub portion 336, which is integral with the hub of turbine section 330, extends axially rearward concentric with central axis 12 and has a cylindrical channel 338 therein which extends axially forward. Channel 338 is also concentric with the central axis 12 and has a mean diameter somewhat less than the outer diameter of cylindrical hub portion 336. The cylindrical channel 338 receives the main rotor shaft 152, which is generally tubular at the axially forward end thereof. The main rotor shaft 152 is secured by electron beam welding to the turbine rotor assembly 52. At its axially rearward end, main rotor shaft 152 engages a hub portion of a compressor rotor 342 with an interference fit to secure the compressor rotor assembly 46 to the main shaft 152. The compressor assembly 46 may be of generally conventional construction and, as shown herein, includes an impeller section 342 and an inducer section 344 which is secured by an interference fit to a cylindrical tube 346 which projects axially rearward from the hub of the impeller section 342. While the compressor assembly 46 may be of conventional construction, a preferred arrangement is disclosed in co-pending patent application, Ser. No. 544,520, filed Jan. 27, 1975, entitled "Centrifugal Compressor With Indexed Inducer Section and Pads For Damping Vibrations Therein", by H. J. Wood.

Figure 12:
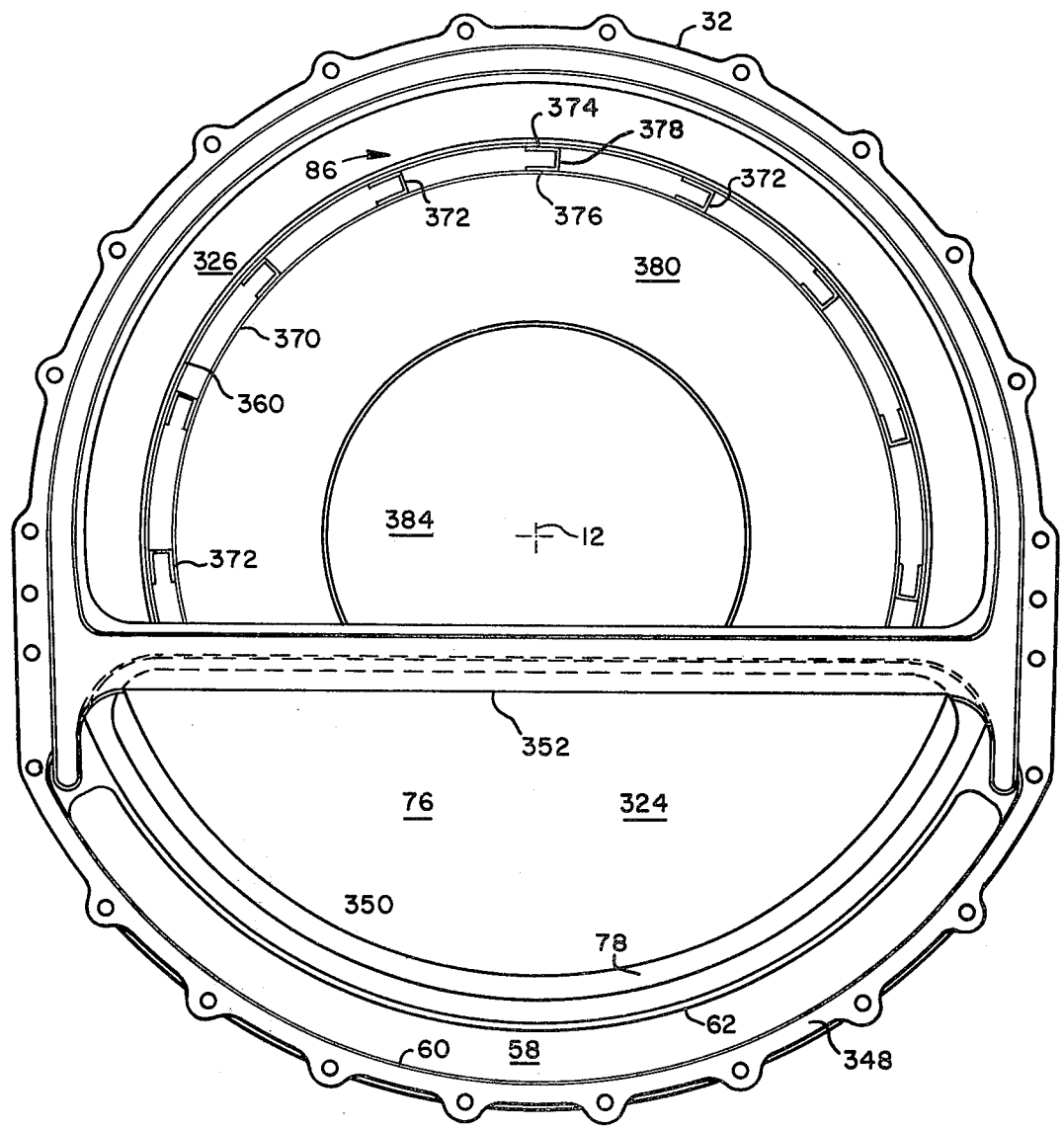
FIG. 12 is an end view of a regenerator housing used in the engine shown in FIG. 1, taken from the rear.

As shown in FIGS. 2 and 12, the regenerator housing 32 is a generally cylindrical element with an outer cylindrical wall 60 which extends from the outer cylindrical wall 54 of main body housing 22 axially forward to engage the regenerator cover 36 along a forward facing, radially extending, circular flange 348. An intermediate wall 62 extends axially forward from wall 56 of main body housing 22 spaced radially inward from wall 60 along the lower one-third of the periphery of the regenerator housing 32 to define the passage 58 between wall 60 and wall 62. A flange 350 at the forward end of intermediate wall 62 supports a semi-circular portion of seal element 72 which engages the periphery of regenerator 34 on the axially rearward side thereof up to a horizontal crossbar 352. A crossbar 352 of regenerator housing 32 is integral with inner wall 76 and supports a crossbar portion of seal element 72 against the regenerator 34 at a position just below hub 68. From the crossbar 352 a semi-circular portion 324 of inner wall 76 extends radially downward and then curves axially rearward to engage a conical section 326 of inner wall 76. Below crossbar 352 the conical section 326 engages the semi-circular portion 324 and above the crossbar 352 the conical section 326 engages the outer wall 60 and is integral therewith. The conical portion 326 extends axially rearward and radially inward to engage the outer periphery of turbine shroud 186 and constrain exhaust gases leaving the turbine assembly 52 to the exhaust chamber 80. A radial metal seal 353 is disposed between a cylindrical axially rearward portion of conical section 326 and the periphery of shroud 186 to seal high pressure chamber 82 from low pressure exhaust chamber 80.

The radial exhaust diffuser 86 is disposed concentrically about central axis 12 adjacent the conical wall section 326. A generally funnel-shaped rearward wall section 360 has an axially rearward extending cylindrical throat portion 362 which curves smoothly into a conical diffuser portion 364. The throat portion 362 has an inside diameter of 4.960 inches and the conical diffuser portion 364 has a total included angle of 124°. The rearward wall section 360 is secured in place by a flange 366 which extends slightly radially outward and snaps over a ridge 388 which extends around the inner circumference of a mating throat portion of conical wall section 326 of regenerator housing 32. Two spaced-apart ridges 368, 369 extend around the inner periphery of conical section 326 at positions axially forward and radially outward from throat 362 in supportive abutment with conical diffuser section 364 of the rearward wall section 360. This snap-in arrangement permits the rearward wall section 360 to be firmly, but removably secured to regenerator housing 32 without need for bolts or screws which might corrode in the environment of the exhaust gases or come loose as a result of temperature changes and engine vibrations.

A forward wall section 370 of diffuser 86 is secured to the rearward wall section 360 by a plurality of U-shaped support members 372 having a first side 374 welded to the periphery of the rearward wall section 360, an opposite side 376 welded to the forward wall section 370 and a connecting side 378 extending therebetween. The connecting sides 378 lie in planes which extend through the central axis 12. Exhaust gas velocity at the outer periphery of diffuser 86, about which the U-shaped support members 372 are substantially equally spaced, is sufficiently low that the connecting sides 378 do not serve as vanes and have substantially no effect upon the exhaust gas flow pattern. From the outer periphery at which the U-shaped support members 372 are welded, the forward wall section 370 extends along a conical section 380 thereof axially rearward and radially inward in generally mating relationship to the conical diffuser portion 364 of rearward wall 360 to approximately the radius of the throat portion 362 and then curves smoothly into a central dish portion 382 adjacent the forward end of the turbine rotor assembly 52. A disk-shaped support member 384 having a radius of approximately 8 inches is welded to the conical diffuser section 380 at a position slightly radially outward of the transition to the dishshaped portion 382 to reduce vibration and noise. Because the conical diffuser section 380 has a total included angle of only 120°, there is a slight divergence between the conical diffuser section 364 and the conical diffuser section 380 in a direction normal to the conical diffuser section 364. At a position near the throat 362, the conical sections 364 and 380 have a minimum spacing of approximately 0.810 inches which increases to a spacing of 1.000 inches adjacent the outer periphery, said dimensions being taken in a direction normal to the conical section 364.

As exhaust gases exit the turbine rotor assembly 52 they are diffused as they pass between the conical diffuser sections 364 and 380. The absence of any vanes in the vicinity of the turbine rotor assembly 52, combined with the gradual diffusion provided by radial exhaust diffuser 86, causes a static pressure rise along the exhaust gas flow path through diffuser 86 as exhaust gas swirl and meridional velocity energy is recovered. Because exhaust gas pressure within the exhaust chamber 80 is very slightly above atmospheric pressure, and because there is a pressure rise through the diffuser 86, the static pressure at the outlet of the turbine rotor assembly 52 is somewhat below atmospheric pressure and the effective pressure drop across the turbine rotor assembly 52 is increased. Unlike axial exhaust diffusers, which may necessarily be very long to permit effective recovery of exhaust gas velocity components, the radial exhaust diffuser 86 is relatively short and increases the overall length of turbine engine 10 only slightly without increasing the width or height of the engine at all. Furthermore, the radial diffuser 86 is much more effective in converting swirl velocity kinetic energy to static pressure.

Figure 13:
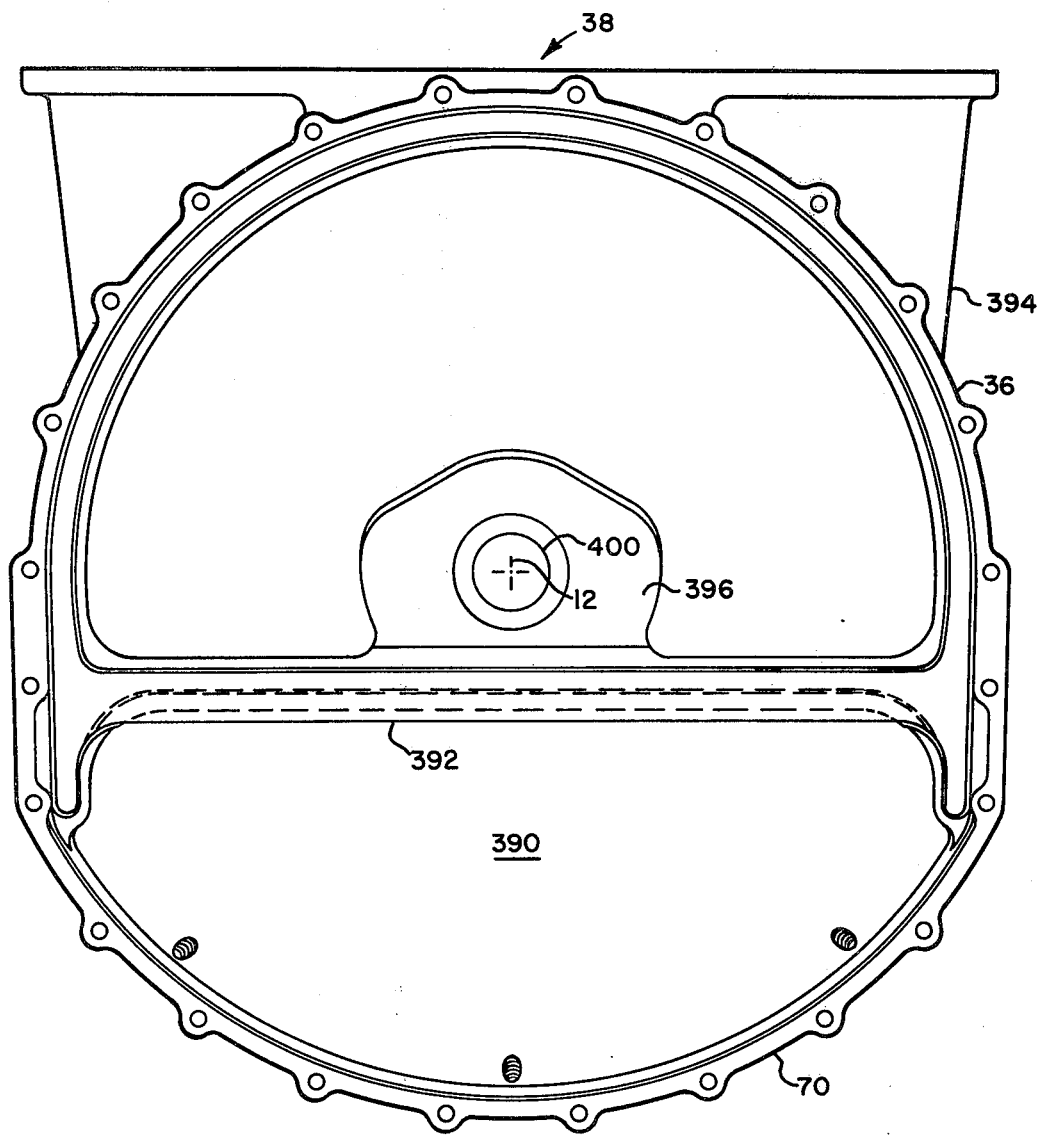
FIG. 13 is an end view of a regenerator cover used in the engine shown in FIG. 1, taken from the rear.

As shown in FIGS. 2 and 13, the regenerator cover 36 has a circumferential, rearward facing flange 70 which mates with, and is bolted to, the forward facing flange 348 of outer circumferential wall 60 of regenerator housing 32. A generally semi-circular wall 390 exceeds between the lower portion of flange 70 and a horizontal crossbar 392 to constrain high pressure gases to the lower portion of regenerator 34 below crossbar 392. The flexible D-shaped seal 66 extends across the crossbar 392 and along the upper periphery of flange 70 to seal high pressure gases away from the upper, exhaust portion of regenerator 34. A stack 394 is integral with the crossbar 392 and upper portion of flange 70 to direct exhaust gases which pass axially forward through regenerator 34 to the upward extending exhaust outlet 38.

A flat surface 396 receives a regenerator motor 398 and has a central bore 400 through which a motor shaft 402 passes to engage and rotationally drive the regenerator 34 from the central hub thereof. While the motor 398 may be implemented in any suitable configuration, such as an electrical motor or even a mechanical linkage to the main rotor shaft 152, motor 398 is conveniently implemented as a hydraulic motor in the application of a standard farm tractor where hydraulic power is readily available.

This arrangement has several advantages from the standpoint of engine operating efficiency. The high temperature, large volume exhaust gases are thus provided the most direct route with the largest cross-sectional area axially forward through the regenerator 34 to be exhausted to the atmosphere. Furthermore, after leaving regenerator 34, the heated, high pressure gases are conducted through passage 78 where further heat exchange may take place between the heated gases and the exhaust gases through the walls 76. This exchange not only further increases the energy of the high pressure gases, but tends to reduce the thermal losses of the exhaust gases before they pass through the regenerator 34. The relatively cool, high pressure gases are passed contiguous to passage 78 through passage 58 adjacent the outer circumference of the engine 10 as they move axially forward toward the forward end of regenerator 34. With the coolest gases toward the outside, heat lost to the atmosphere along these passages is minimized. This engine configuration also provides a relatively short travel distance for all working gases, but it is the high pressure, low temperature, small volume gases which pass through the greater distance in comparison to the exhaust gases. The ducts for guiding these gases can thus be smaller in size and, because the viscosity of gases is lower for lower temperatures, losses are minimized as the gases are transported to and from the regenerator 34. Furthermore, this arrangement permits the exhaust gases to exit to the atmosphere at a position that is axially displaced from the intake of engine 10 to minimize the heating of the intake air by the exhaust gases. Such heating is detrimental to engine power output, which increases as inlet air temperature decreases.

Under standard aircraft test conditions, the single shaft gas turbine engine 10 develops a corrected horsepower of 238 horsepower and has a brake specific fuel consumption (BSFC) of 0.440 lbs. per horsepower hr. while the engine rotates at a speed of 67,152 rpm. Air enters the engine through triangular apertures 24 at a pressure of 14.696 psia and a temperature of 59° F. at a flow rate of 2.355 lbs. per second. The combination of the compressor assembly 46, which has an outside diameter of 6 inches and the high pressure diffuser 48 provide a 6.2:1 total to static pressure ratio with the gases being discharged from high pressure diffuser 48 into passages 170 and 50 with a pressure of 91.14 psia and a temperature of 507° F. The high pressure gases are then carried axially forward adjacent the periphery of the engine 10 on the lower side thereof through passage 50 to the forward side of regenerator 34. While passing axially rearward through the lower half of regenerator 34, the working gases experience a slight pressure drop as a result of an approximately 0.27 psi drop required to force the gases through the regenerator. While passing through the regenerator 34, heat from the exhaust gases is transferred to the high pressure gases and they leave the regenerator 34 with a temperature of 896.4° F.

As the gases leave the regenerator 34 they are guided along the underneath side of the engine through passage 78 between the exhaust gases and the unheated high pressure gases in passage 58 past the radial exhaust diffuser 86 to the vicinity of the combustor 28. As the high pressure gases pass through the regenerator 34 they experience a seal leakage loss of approximately 2.2 percent of the mass flow and a carry-over loss, i.e. gas which remains in the passages of regenerator 34 as they rotate from the lower high pressure area to the upper low pressure exhaust area, of approximately another 1 percent. The high pressure heated gases thus enter the combustor 28 with a mass flow rate of approximately 2.280 lbs. per second.

The combustor 28 has an efficiency of approximately 99 percent and the working gases leave the combustor with a total pressure of 88.195 psia and a temperature of 1800° F.

The turbine rotor assembly 52 has an outside diameter of 7.79 inches and receives the mass flow rate of working gas of 2.307 lbs. per second with a total to total adiabatic efficiency of 0.90.

The working gases exit the turbine rotor assembly 52 at a total pressure of approximately 16.00 psia and a temperature of 1250° F. and then proceed through the radial exhaust diffuser 86 where the static pressure is increased slightly to 15.51 psia. As the exhaust gases pass axially forward through the upper half of regenerator 34, they experience a 0.81 psi pressure drop and exit to the atmosphere at the standard pressure of 14.7 psia. While passing through regenerator 26, the temperature of the exhaust gases is reduced from approximately 1022° F. to approximately 633° F. The regenerator motor 398 consumes approximately one-half horsepower while the gear box assembly 14 and the main rotor bearing 156 consume approximately 6.2 horsepower at the rated conditions.

Figure 14:
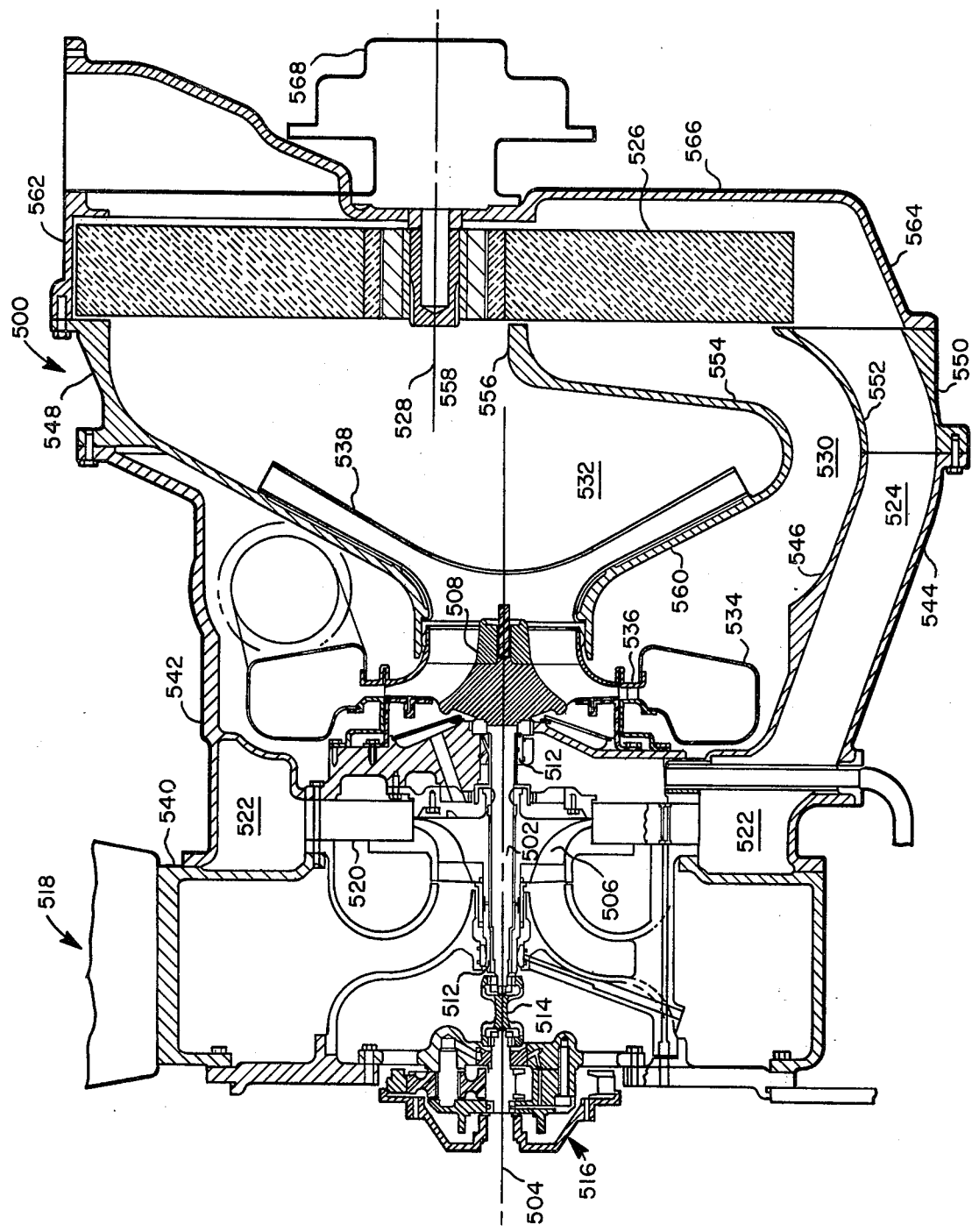
FIG. 14 is a sectioned side elevation view of an alternative arrangement of a gas turbine engine in accordance with the invention, taken predominantly along a vertical plane through a central axis.

In an alternative arrangement shown in FIG. 14, a single shaft gas turbine engine 500 in accordance with the invention has a main rotor shaft 502 disposed concentrically about a central axis 504. A compressor assembly 506 is secured concentrically about main rotor shaft 502 at approximately the axial midpoint thereof and a turbine assembly 508 is supported in cantilever fashion from the axially foward end of main rotor shaft 502. A forward main bearing 510, which is disposed between the compressor assembly 506 and turbine assembly 508 and a rear main bearing 512, which is disposed axially rearward of compressor assembly 506, support the main rotor shaft 502 with more stability than the stability provided by the closely single main bearing 156 of gas turbine engine 10. A short shaft 514 couples the rear extremity of main rotor shaft 502 to a planetary gear reduction assembly 516.

Intake air passes through an air inlet 518 to the radial compressor 506. As the inlet gases radially exit the compressor 506 they pass through an annular high pressure channel diffuser 520 to a circumferentially extending collecting plenum 522. The collecting plenum 522 communicates with a passage 524 which extends along the lower portion of engine 500 adjacent the outer periphery thereof to the forward surface of the lower half of a regenerator 526 which rotates about a regenerator axis 528 which is parallel to and approximately, but not exactly, in line with central axis 504. The high pressure gases then pass axially rearward through the lower half of regenerator 526 to a passage 530 which carries the gases axially rearward along the lower portion of engine 500 between the passage 524 and an exhaust chamber 532 to a combustor (not shown) which is attached to scroll 534. The gases are heated in the combustor and distributed by scroll 534 through a nozzle assembly 536 to impinge radially inward upon the centrifugal turbine rotor 508. The exhaust gases exit the turbine rotor 508 in an axially forward direction and are passed through a radial exhaust diffuser 538 to the exhaust chamber 532 which communicates with the upper half of the regenerator 526 on the axially rearward side thereof. From the exhaust chamber 532 the exhaust gases flow axially forward through the upper half of the regenerator 526 to the atmosphere.

While the engine 500 preserves the same advantageous component configuration and flow path arrangement as the engine 10, the engine 500 has a somewhat simpler support structure. An inlet housing 540 at the rear of the engine 500 receives the intake gases and circumferentially distributes them about the intake to radial compressor 506. The inlet housing assembly 540 also supports the planetary gear reduction assembly 516 and the rear main bearing 512. A main body housing assembly 542 is coupled to the forward end of inlet housing assembly 540 and supports the front main bearing 510. Main body housing assembly 542 has a generally cylindrical outer wall 544 and a semi-circular dividing wall 546 which defines the passsge 524 adjacent the outer wall 544.

A regenerator housing assembly 548 is disposed between the main body housing assembly 542 and the regenerator 526. Regenerator housing assembly 548 has a cylindrical outer wall which mates with outer wall 544, a dividing wall 552 which mates with dividing wall 546 along the lower portion of engine 500 and an inner wall 554 which extends along a horizontal crossbar 556 immediately below a hub 558 of regenerator 526 and then extends radially downward with a semi-circular shape toward a conical section 560 which is integral with the outer cylindrical wall 550 above the crossbar 556. The wall 554 divides the exhaust chamber 532 from passage 530. Radial diffuser 538 is disposed along the inside of conical wall section 560.

A regenerator cover 562 has a cylindrical outer wall 564 which mates with the forward end of cylindrical wall 550 and a semi-circular cover section 566 extends horizontally across the forward side of the regenerator 526 below the hub 558 and extends radially downward to engage the periphery of cylindrical outer wall 564 and constrain the high pressure gases to the forward side of the lower half of regenerator 526. A regenerator motor 568 rotationally drives the hub 558 of regenerator 526.

Figure 15:
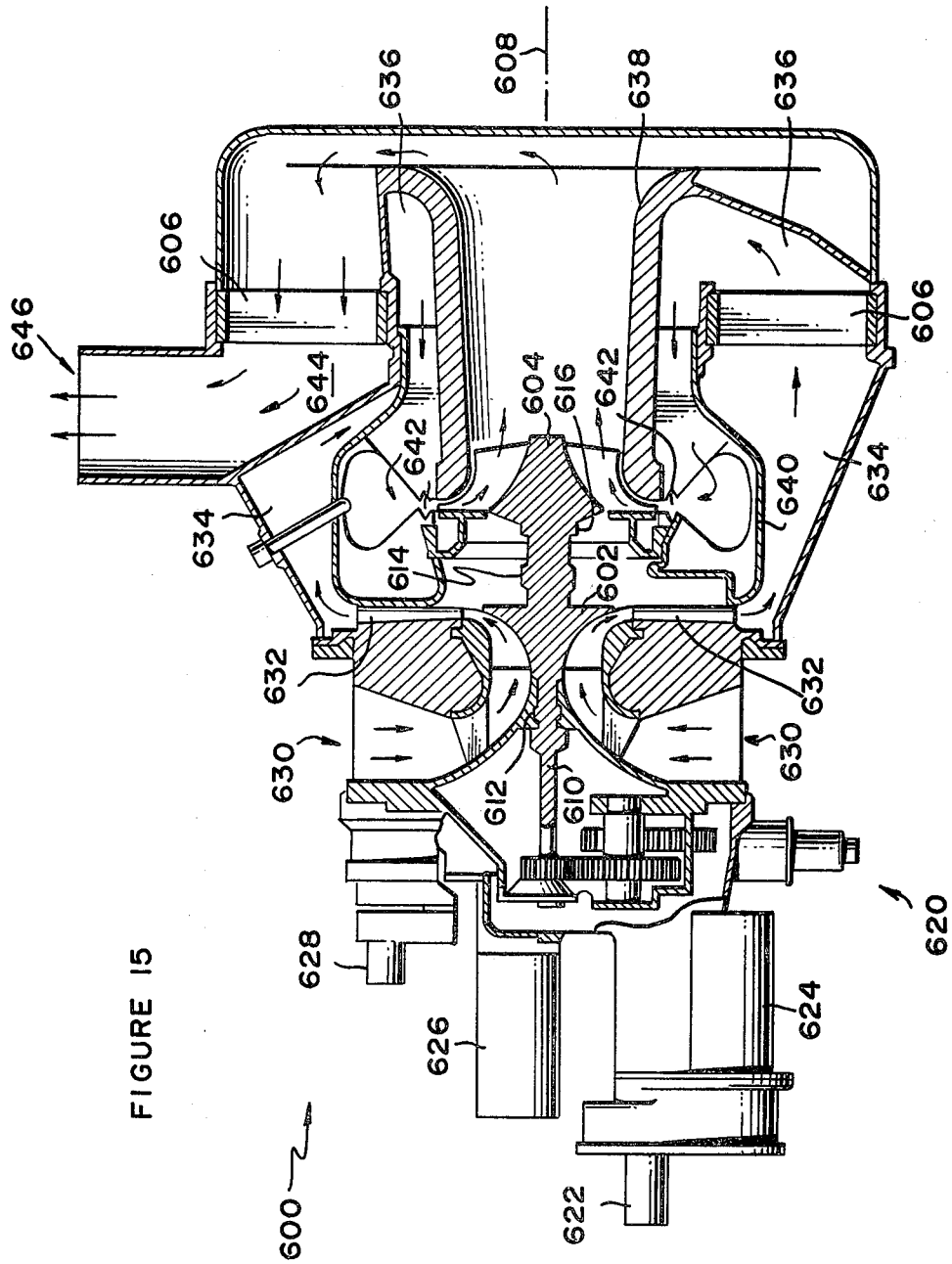
FIG. 15 is a sectioned side elevation view of another alternative arrangement of a gas turbine engine in accordance with the invention, taken predominantly along a vertical plane through a central axis.

In an alternative arrangement shown in FIG. 15, a single shaft gas turbine engine 600 includes a compressor 602, a turbine 604 and a toroidal regenerator 606 disposed successively along and for rotation about a central axis 608. The compressor 602 and turbine 604 are mounted on a single shaft 610 which is supported for rotation about central axis 608 by bearings 612, 614 and 616. Central shaft 610 is coupled through a suitable gear reduction assembly 620 to drive an output shaft 622 as well as accessory equipment such as a starter 624, a fuel control 626 and an alternator 628.

As indicated by the arrows, air passes radially inward through air inlets 630 which surround the engine 600 toward the radial outflow compressor 602. Intake air enters the compressor 602 flowing in a generally axially forward direction and is expelled by the compressor 602 radially outward to a high pressure diffuser 632 which surrounds the periphery of the compressor 602 at the outlet thereof. A plenum 634 which surrounds the outer circumference of high pressure diffuser 632 from which high pressure gases are emitted collects the high pressure gases from around the periphery of the engine and carries the high pressure gases toward the lower half of the engine and axially forward toward the toroidal regenerator 606.

The high pressure gases pass in an axially forward direction from the plenum 634 through the lower half of regenerator 606 to receive heat which is extracted from engine exhaust gases. After passing through regenerator 606, a second plenum 636 collects the heated high pressure gases from the lower half of regenerator 606 and redistributes the heated gases about the periphery of turbine 604 and a conical exhaust diffuser 638 which passes through the center of toroidal regenerator 606 interior to the heated high pressure gases. The plenum 636 guides the heated, high pressure gases axially rearward between an inner circumference of toroidal regenerator 606 and a somewhat smaller outer circumference of conical exhaust diffuser 638 to a scroll and combustor assembly 640.

After being further heated by fuel supplied to the scroll and combustor assembly 640, the high pressure gases pass radially inward through nozzles 642 to expand and rotationally drive the turbine 604. Exhaust gases exit the turbine 604 in an axially forward direction to the conical exhaust diffuser 638 which guides the exhaust gases axially forward through the center of regenerator 606. After passing through the center of regenerator 606, the exhaust gases are guided to the upper half of regenerator 606 where they pass axially rearward therethrough. As the exhaust gases pass through regenerator 606 heat is extracted therefrom for heating the high pressure gases and the cooled exhaust gases are collected by a manifold 644 and guided through an exhaust outlet 646 to exit at the top of engine 600.

The engine 600 thus represents an alternative arrangement of a single shaft gas turbine engine having a recouperator mounted axially in line with a central axis and on the opposite side of the turbine from the compressor. The engine 600 differs from the engine arrangements shown in FIG. 2 and FIG. 14 primarily in that engine 600 uses a toroidal for a recouperator instead of a disk regenerator and a conical diffuser instead of a radial exhaust diffuser. Gas flow directions through the regenerator are reversed with high pressure gases passing axially forward through the lower half of the regenerator 606 and lower pressure exhaust gases passing axially rearward through the upper half of regenerator 606 toward the turbine 604 and compressor 602. Toroidal regenerator 606 is more conveniently supported and rotationally driven from the outer circumference in contrast to the hub drive for the disk regenerators.

While there have been shown and described above particular arrangements of single shaft gas turbine engines in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

I claim:

1. A gas turbine engine comprising a compressor mounted for rotation about a central axis; a single stage radial inflow turbine mounted axially forward of the compressor for rotation about the central axis, the turbine engine being coupled to drive the compressor and being arranged to discharge exhaust gases in an axially forward direction; a disk regenerator which is mounted axially forward of the turbine in line with the central axis and which is coupled to pass high pressure gases therethrough in one direction and exhaust gases therethrough in an opposite direction; and a radial exhaust diffuser disposed between the turbine and the regenerator, the exhaust diffuser being coupled to receive exhaust gases from the turbine and discharge the exhaust gases to the regenerator.

2. A single shaft gas turbine engine comprising a single stage radial flow out compressor mounted for rotation about a central axis, a single stage radial inflow turbine mounted axially forward of the compressor for rotation about the central axis which is directly coupled to drive the compressor and which discharges exhaust gases in an axially forward direction; a disk regenerator disposed axially forward of the turbine with an axis of rotation in approximate alignment with the central axis, the regenerator being coupled to pass high pressure gases for driving the turbine therethrough in a first direction and exhaust gases from the turbine therethrough in an opposite direction; and a radial exhaust diffuser having first and second spaced conical sections disposed between the turbine and regenerator, the diffuser being coupled for passage of exhaust gases from the turbine through the diffuser between the first and second conical sections to the regenerator.

3. The improvement according to claim 1 above, wherein the radial exhaust diffuser includes first and second spaced conical sections between which the exhaust gases are constrained to pass.

4. The improvement according to claim 3 above, wherein the first conical section has a total included angle of approximately 125°.

5. The improvement according to claim 4 above, wherein the second conical section is disposed axially forward of the first conical section and has a total included angle of approximately 120°.

6. The improvement according to claim 5 above, wherein the first and second conical sections have a minimum spacing of approximately 0.810 inch.

* * * * *

UNITED STATES PATENT AND TRADEMARK OFFICE
CERTIFICATE OF CORRECTION

PATENT NO. : 4,177,638

DATED : December 11, 1979

INVENTOR(S) : Homer J. Wood

It is certified that error appears in the above-identified patent and that said Letters Patent are hereby corrected as shown below:

Column 7, line 39, "passge" should read --passage--; line 61, after "plenum" and before "advantageously", "58" should read --50--. Column 8, line 55, after "oil" and before "116", "pump" should read --sump--. Column 12, line 37, after "the" and before "portion", "dishshaped" should read --dish-shaped--. Column 16, lines 45 and 46, after "expand" and before "and", insert --against--; line 65, after "toroidal" and before "for", insert --regenerator--. Column 17, lines 22 and 23, after "turbine" and before "being", strike "engine".

Signed and Sealed this

Twenty-ninth Day of April 1980

[SEAL]

Attest:

SIDNEY A. DIAMOND

Attesting Officer

Commissioner of Patents and Trademarks